(12) United States Patent
Favagrossa (10) Patent No.: US 8,887,341 B2
(45) Date of Patent: Nov. 18, 2014

(54) WASHING BRISTLE BRUSH FOR AUTOMATIC MOTOR VEHICLE WASHING SYSTEMS, INCLUDING A PLURALITY OF ENDLESS BELT ELEMENTS ENTRAINED AT THE TWO PORTIONS THEREOF ON ENTRAINING ROLLERS DRIVEN BY ELECTRIC MOTORS OR MECHANICAL DRIVING MEMBERS (75) Inventor: Francesco Favagrossa, Cremona (IT)

(73) Assignee: Favagrossa Edoardo S.R.L., Cremona (IT)

( * ) Notice: Subject to any disclaimer, the term of this patent is extended or adjusted under 35 U.S.C. 154(b) by 0 days.

(21) Appl. No.: 13/552,291

(22) Filed: Jul. 18, 2012

(65) Prior Publication Data
US 2013/0019419 A1 Jan. 24, 2013

(30) Foreign Application Priority Data

Jul. 18, 2011 (IT) .............................. MI2011A1330

(51) Int. Cl.
B60S 3/06 (2006.01)
A46B 5/06 (2006.01)
B60S 3/00 (2006.01)

(52) U.S. Cl.
CPC .......... B60S 3/06 (2013.01); A46B 2200/03046 (2013.01); A46B 5/06 (2013.01); B60S 3/002 (2013.01); Y10S 15/02 (2013.01)
USPC ........................... 15/53.3; 15/97.3; 15/DIG. 2

(58) Field of Classification Search
USPC ................... 15/53.1, 97.3, DIG. 2, 53.2, 53.3
See application file for complete search history.

(56) References Cited

U.S. PATENT DOCUMENTS

| 3,405,453 | A | * | 10/1968 | Ries | 34/335 |
| 3,678,527 | A | * | 7/1972 | Ries | 15/97.3 |
| 4,192,036 | A | * | 3/1980 | Heymann | 15/53.3 |
| 7,346,954 | B2 | * | 3/2008 | Weber et al. | 15/53.1 |
| 7,805,798 | B2 | * | 10/2010 | Belanger | 15/230.16 |

* cited by examiner

Primary Examiner — Randall Chin
(74) Attorney, Agent, or Firm — Hedman & Costigan, P.C.; James V. Costigan; Kathleen A. Costigan (57) ABSTRACT An improved brush for automatic motor vehicle washing systems, characterized in that said washing brush comprises a plurality of endless belt elements entrained, at the two end portions thereof, on entraining rollers driven by one or more electric motors or mechanical driving means to perform a linear movement pattern including a double rectilinear translation movement and a partial rotary movement.

4 Claims, 8 Drawing Sheets

WASHING BRISTLE BRUSH FOR AUTOMATIC MOTOR VEHICLE WASHING SYSTEMS, INCLUDING A PLURALITY OF ENDLESS BELT ELEMENTS ENTRAINED AT THE TWO PORTIONS THEREOF ON ENTRAINING ROLLERS DRIVEN BY ELECTRIC MOTORS OR MECHANICAL DRIVING MEMBERS

BACKGROUND OF THE INVENTION

The present invention relates to an improved washing bristle brush for automatic motor vehicle washing systems which, differently from conventional washing brushes, includes two or more rollers, rotatively driven by one or more electric motors, and supports endless belt elements driven along longitudinal directions for performing a double longitudinal translation movement and a double partial rotary movement.

As is known, prior motor vehicle washing systems comprise a plurality of bristle washing brushes the bristles of which contact the vehicle bodies driven by the centrifugal force of the brush rotary central rollers.

Prior rotary washing brushes have the drawback that they adhere only to limited portions of the motor vehicle body as said brushes are longitudinally driven to clean the motor vehicle body surface.

Moreover, conventional washing brushes are rotatively supported by a respective supporting roller, either vertically or horizontally arranged, to clean the motor vehicle side surfaces and hood, as well as the motor vehicle glass elements.

While the above prior washing brushes have been found as substantially satisfactory, they, however, have a low washing speed and a high power consumption.

SUMMARY OF THE INVENTION

Thus, the main object of the present invention is to overcome the above drawbacks of prior art motor vehicle washing brushes.

According to one aspect of the present invention, the above mentioned aim, as well as yet other objects, which will become more apparent hereinafter, are achieved by an improved washing brush for automatic motor vehicle washing systems, characterized in that said washing brush comprises a plurality of endless belt elements entrained, at the two end portions thereof, on entraining rollers driven by one or more electric motors or mechanical driving means as to perform a linear movement pattern including a double rectilinear translation movement and a partial rotary movement.

According to a further aspect of the present invention, the inventive washing brush has a very broad active washing surface, thereby washing the motor vehicle body substantially on its overall surface.

Moreover, the pulling force applied to the inventive washing brush may be also provided by a central motor applying a pulling force on a central roller and on the belt elements entrained, at the two side end portions thereof, on transmission rollers.

Said transmission rollers may be perfectly aligned along a longitudinal axis, or may comprise a central roller offset from the other rollers.

Thus, the bristles of the inventive linear brushes operate on a very broad surface of the vehicle body to be washed.

More specifically, in the inventive brushes, the plurality of belt elements are arranged adjoining one another and comprise washing bristles to be fixed to the belt elements, which belt elements may be quickly and easily replaced as their bristles are worn.

The bristles are preferably constituted by bent or folded sheet elements, of a closed cell foamed plastic material, partially longitudinally cut to provide flexible bristle elements adapted to efficiently clean the motor vehicle side, front, rear and top surfaces, with low electric power consumption and a high washing speed.

BRIEF DESCRIPTION OF THE DRAWINGS

The above mentioned and other features of the linear washing brushes for automatic motor vehicle washing systems according to the present invention will become more apparent from the following detailed disclosure of a preferred embodiment thereof, with reference to the accompanying drawings, where:

FIG. 5 shows the broad washing surface of the belt element washing brushes according to the present invention;

DESCRIPTION OF THE PREFERRED EMBODIMENTS

With reference to the above disclosed drawing figures, is herein shown an improved washing brush 1 to be used for washing motor vehicles in general, and which, according to a main aspect of the present invention comprises a plurality of belt elements 2 including a plurality of band or flag elements 3, each preferably made of a closed cell foamed plastic material folded sheet including, at an end portion 5 thereof, a plurality of longitudinal cuts 6 defining a plurality of washing bristles 7.

More specifically each said band or flag element 3, comprise a starting or inner stiffener folded bottom portion 4 and said end portion or outer region 5 in which the bristles 7, split into thin strips, have a greater flexibility.

It should be moreover pointed out that the linear washing brushes according to the present invention, including the above mentioned belt elements 2, is so designed that the belts 2 follow substantially rectilinear trajectories into two opposite directions thereby performing partial rotary movement allowing washing water and partial impurities removed from the motor vehicle bodies to be outward projected.

Thus, the belts 2, which are supported, at their end portions, on respective portions of entraining flat rollers 8 (see for example FIG. 1) perform a partial rotary movement around the entraining rollers in a reciprocating manner as a result of movement from the piston or cylinder allowing washing water and possible impurities removed from the motor vehicle bodies to be outward projected.

Figure 1:
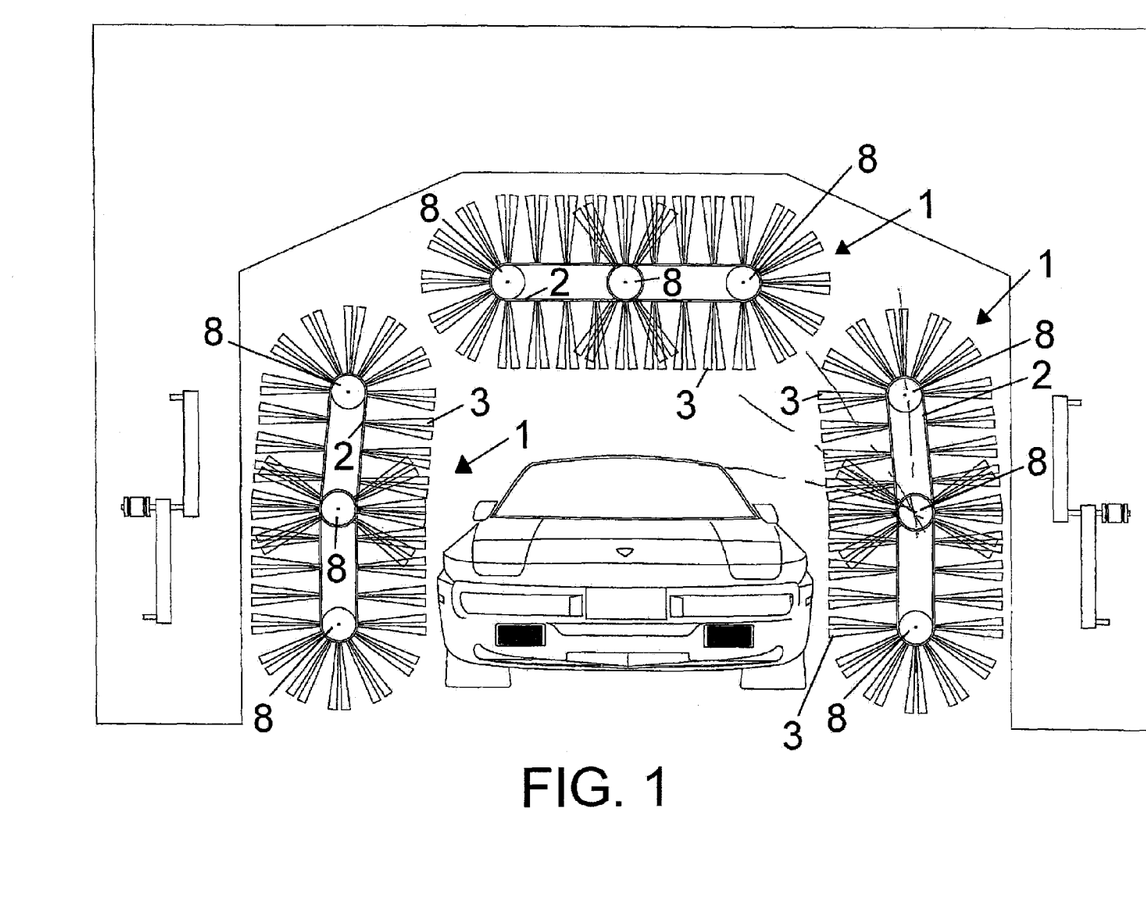
FIG. 1 is a schematic view showing a motor vehicle washing system, including a plurality of linear belt element washing brushes according to the present invention.
Figure 2:
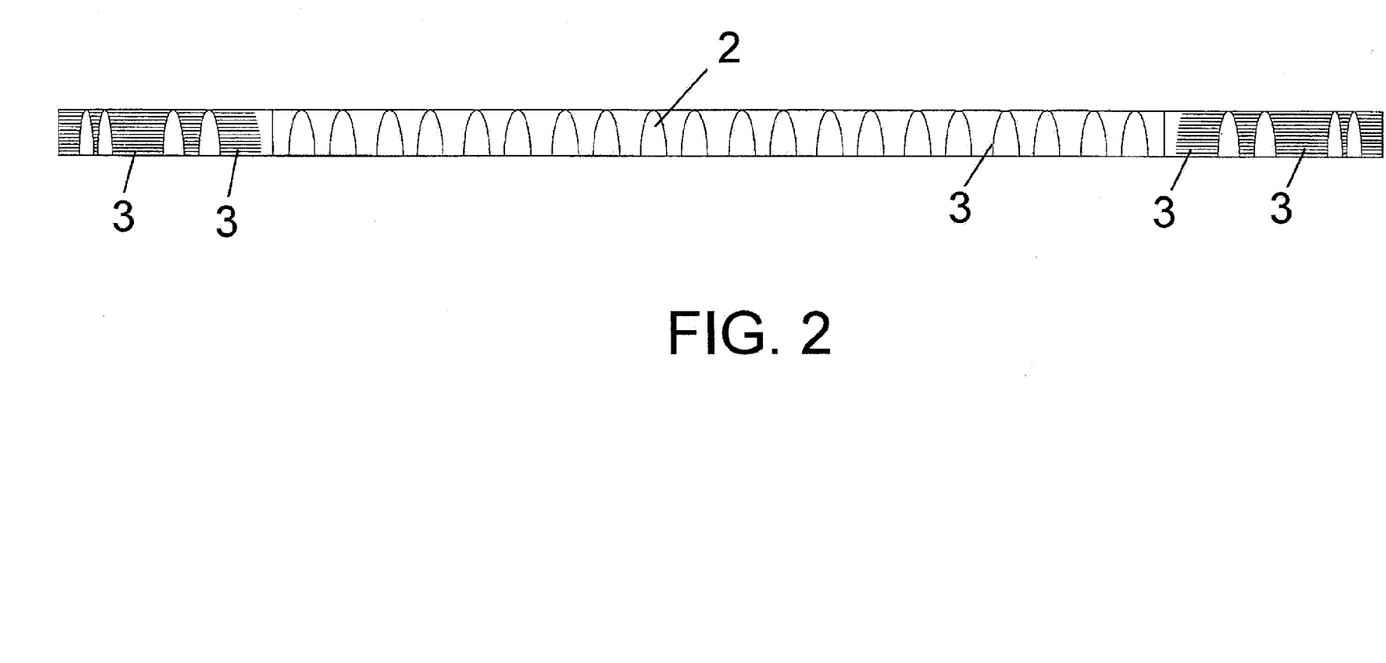
FIG. 2 schematically shows a washing belt element including closed cell foamed plastic material folded sheet flag or band elements including, at their end portions, bristles formed by longitudinally cutting the end portions of the flag or band elements.
Figure 3:
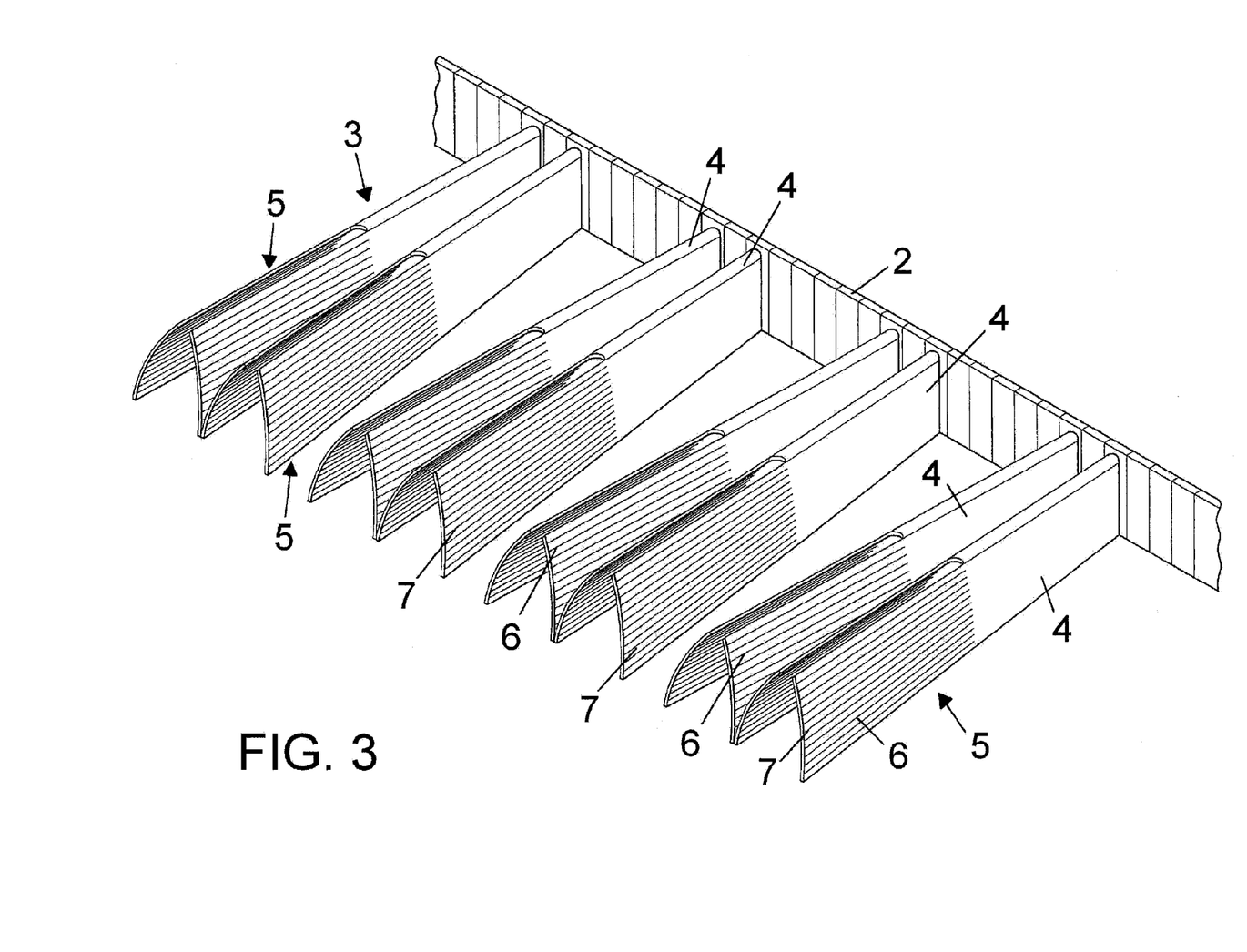
FIG. 3 is a perspective side-front view of one of the washing belt elements.
Figure 4:
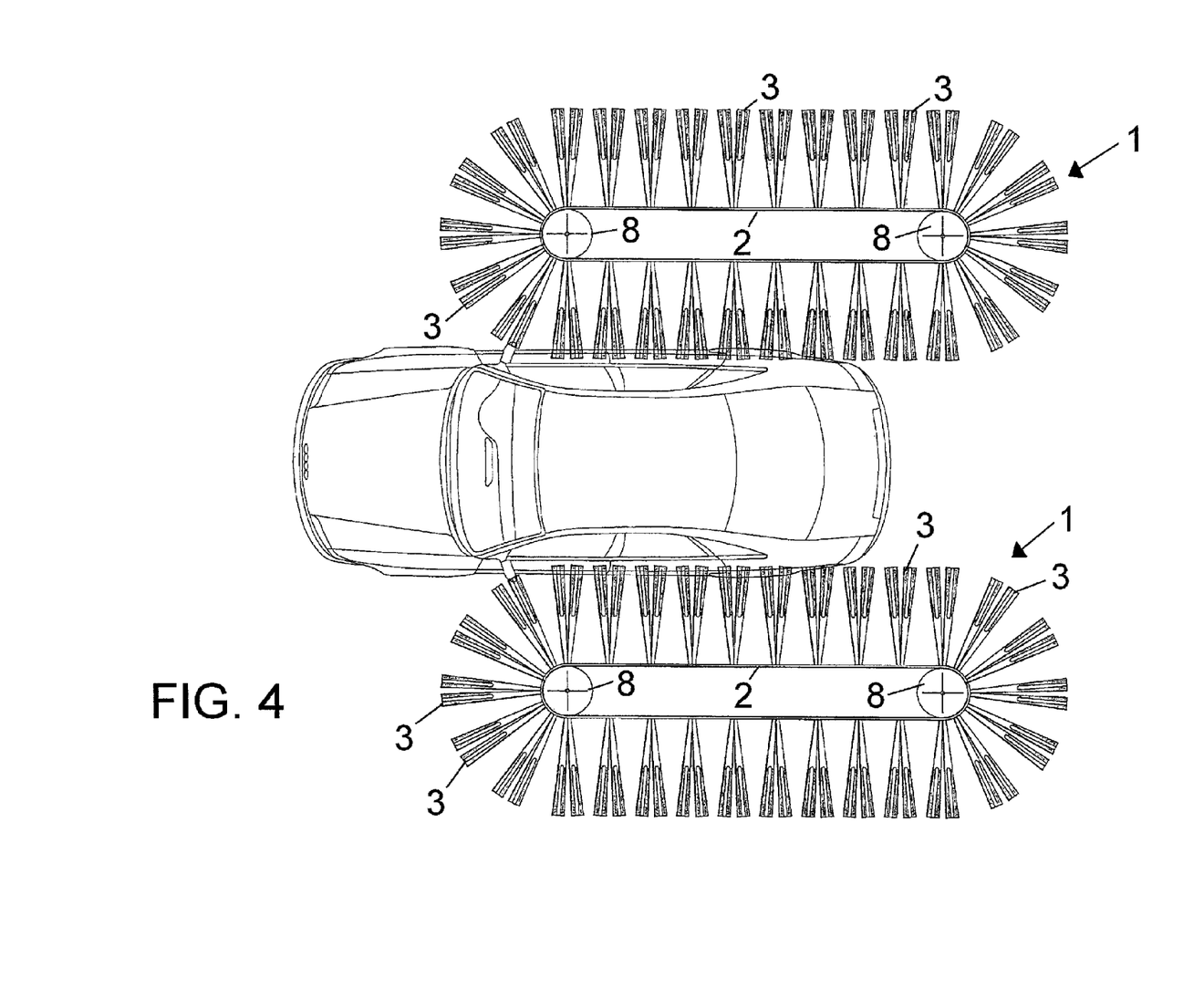
FIG. 4 is a top plan view showing two washing brushes including linear extending belts, and two vertical shafts for washing a broad side surface of the motor vehicle.

The flat rollers 8 comprise a plurality of entraining tooth elements engaging with corresponding tooth elements on a surface of each said belt.

Figure 5:
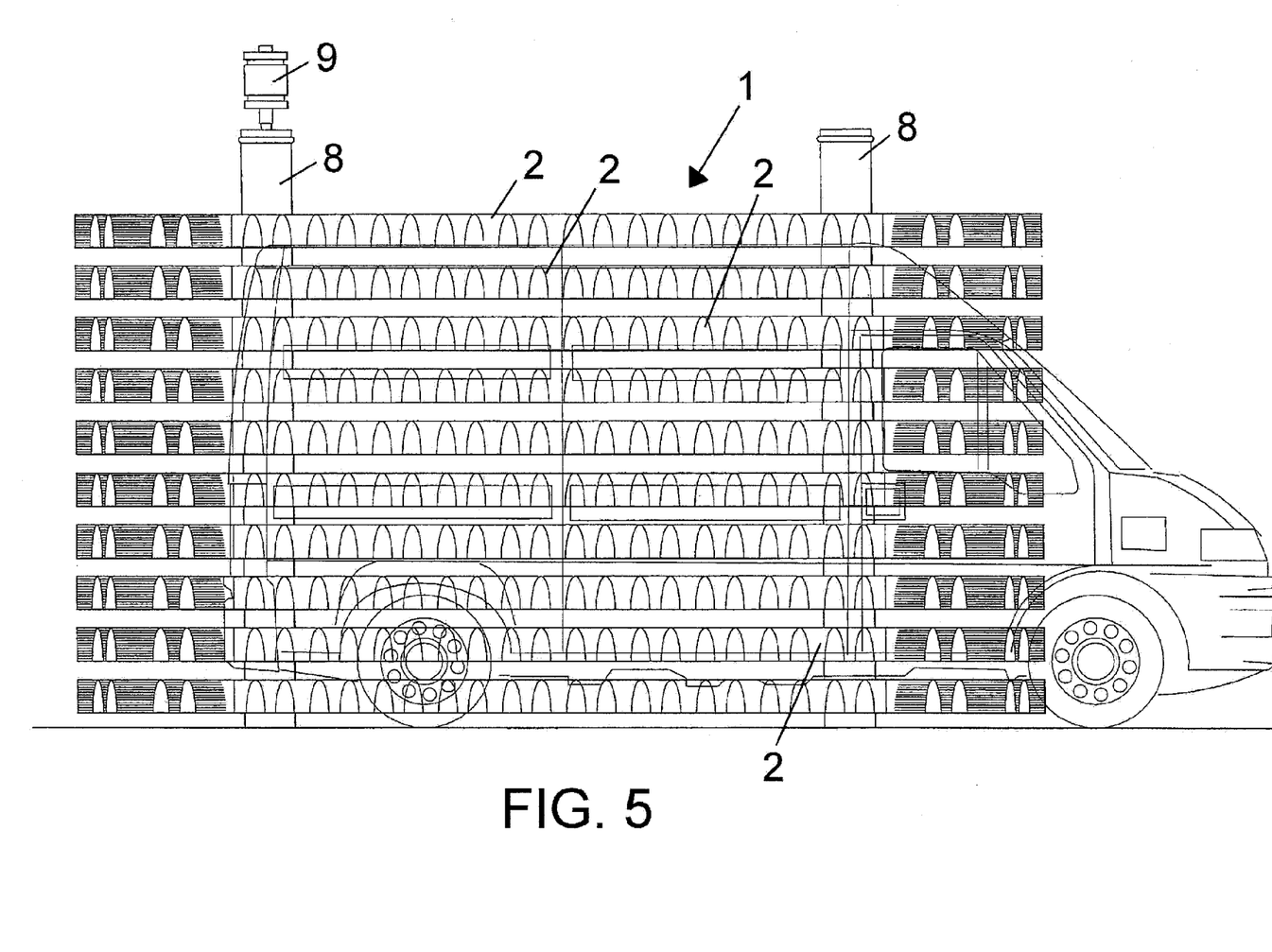
FIG. 5 is a side view of a linear washing brush according to the present invention, showing a plurality of washing belts supporting respective band elements including washing bristles and driven with a substantially linear movement including a partial rotary movement of the belt elements.

One or more of said entraining rollers is/are driven by respective electric motors 9 (FIG. 5) or mechanical driving means.

Figure 6:
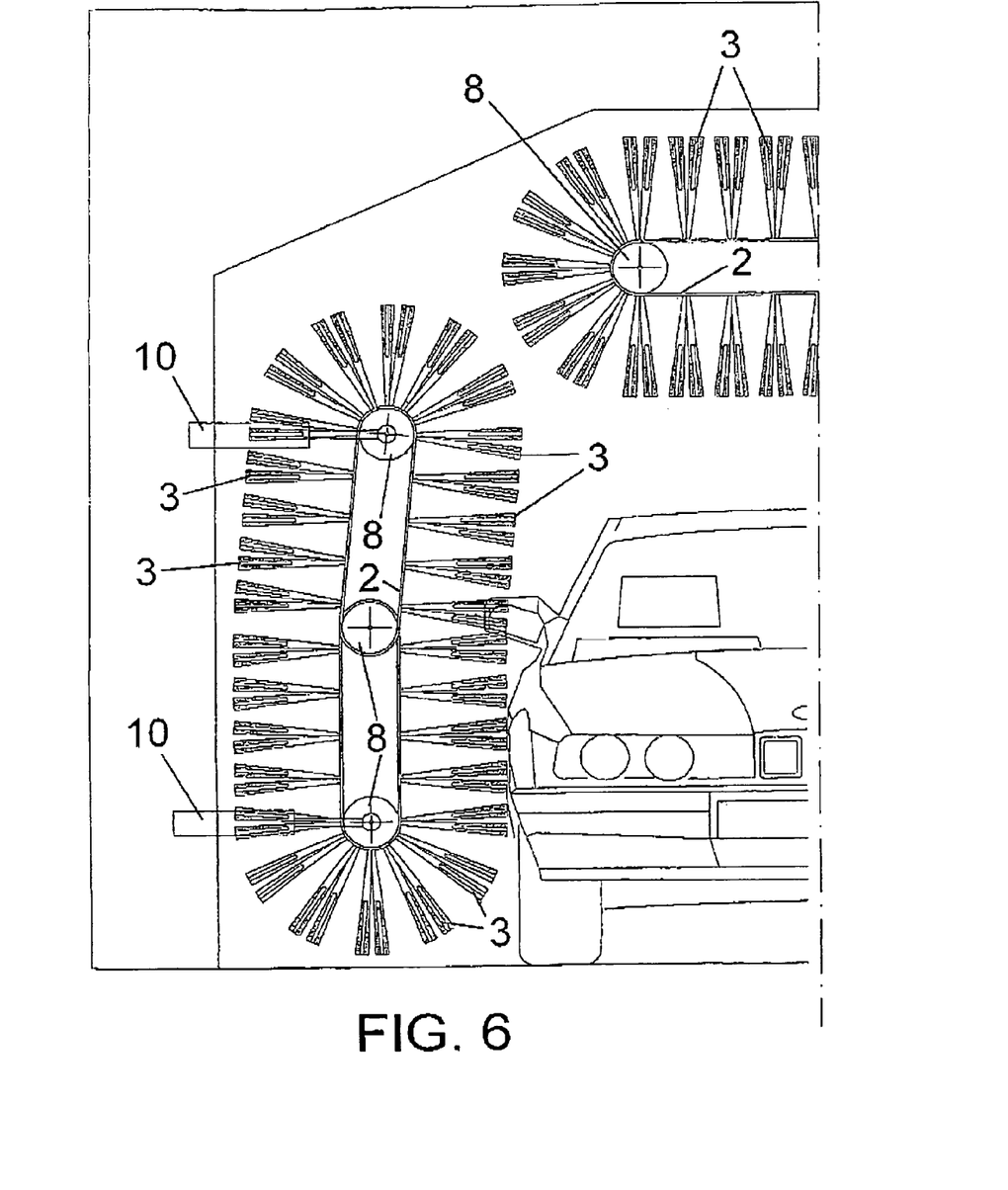
FIG. 6 shows a front portion of a motor vehicle washing system including a washing brush having supporting pistons or cylinders for driving the washing brush to contact the side surface of a motor vehicle body, even if said body surface is greatly curved and/or a complex one.
Figure 7:
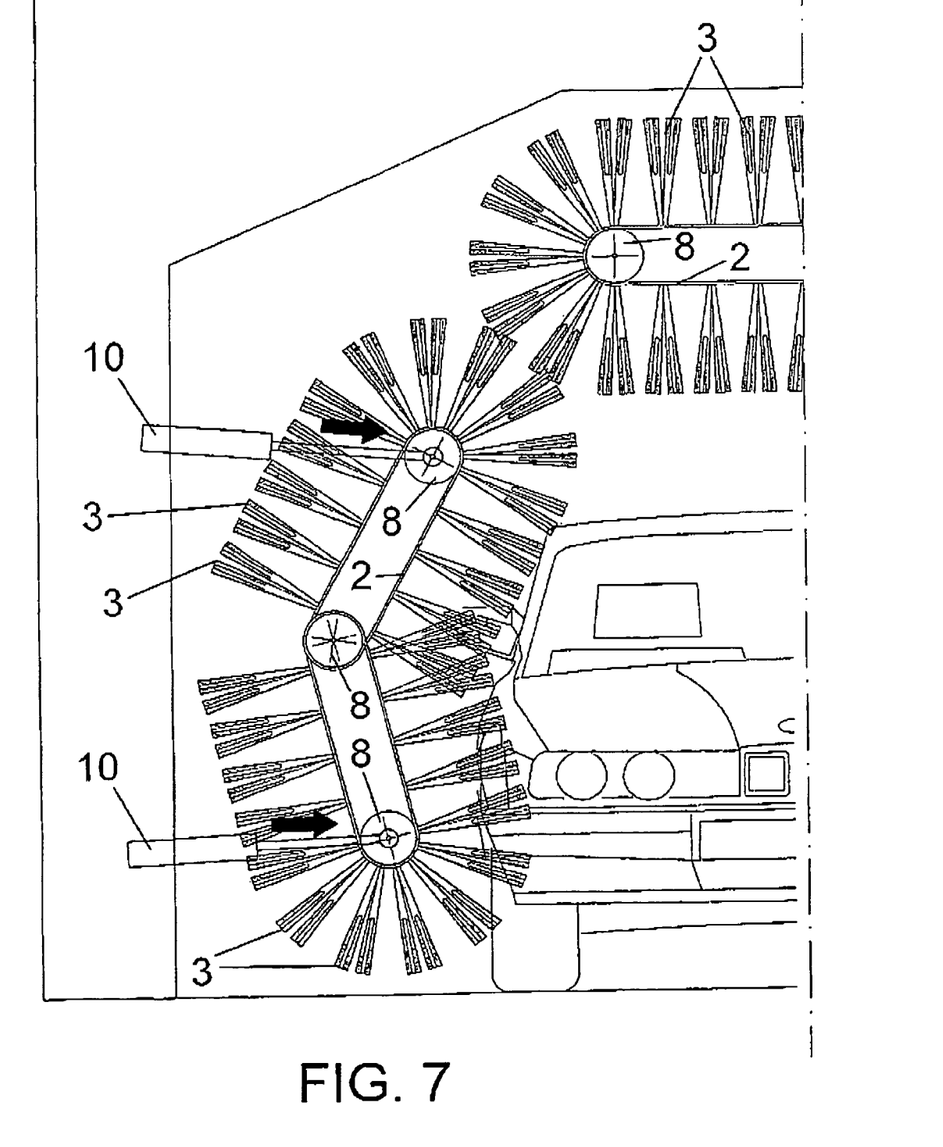
FIG. 7 shows a side washing brush, like that shown in FIG. 6, but arranged with a larger slanting angle thereby to better fit the shape of the motor vehicle being washed.
Figure 8:
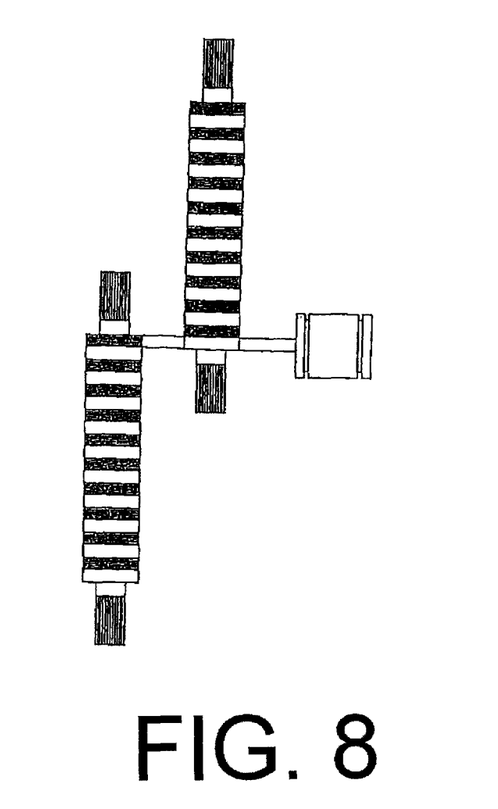
FIG. 8 shows two felt-material coated auxiliary rollers for drying a motor vehicle at the end of the washing operation, which drying operation may also be performed by the inventive linear brushing using felt material bristles.

With reference to FIGS. 6 and 7, they show a front portion of a motor vehicle washing system with a washing brush 1 including a plurality of supporting hydraulic or pneumatic pistons or cylinders 10 allowing said washing brush to contact and adhere to a motor vehicle body, even if said body has a protruding or curved configuration.

FIGS. 6 and 7 show the washing brush 1 following a curved linear trajectory, since it is pivoted about its central shaft and is supported by said hydraulic or pneumatic cylinders, the washing brush 1 performing a swinging movement, to perfectly adhere to the motor vehicle body surface.

While the inventive linear washing brushes 1 have been thereinabove disclosed with reference to a preferred embodiment thereof, it should be apparent that the disclosed embodiment is susceptible to several modifications and variations, all of which will come within the scope of the invention.

In particular, the washing brush belts may also support wire bristles of a circular cross section.

The invention claimed is:

1. A washing brush for automatic motor vehicle washing systems, said washing brush comprising a plurality of endless belt elements entrained at end portions thereof on peripheral portions of entraining rollers at least one of which is driven by one or more electric motors or mechanical driving means causing said endless belt elements to follow substantially linear trajectories into two opposite directions, said entraining rollers also operating to tension said belts which, in an assembled condition thereof, form said automatic motor vehicle washing system washing brush, said belt elements being arranged adjoining one another and comprise belt bristles coupled to said belt elements at a set distance from one another, thereby providing a comparatively large width washing brush and allowing said belts to be easily replaced as required or as said bristles are worn, characterized in that said washing brush comprises a plurality of closed cell foamed plastic material sheet elements so folded and cut as to provide belt bristles that are flexible for washing front, rear and top portions of a motor vehicle.

2. A washing brush, according to claim 1, characterized in that said belt bristles are made by longitudinally cutting the end portions of said flag closed cell foamed plastic material sheet elements.

3. A washing brush, according to claim 2, characterized in that each said closed cell foamed plastic material sheet element comprises, at an attachment region thereof, longitudinally folded portions providing, at an attachment base and middle region thereof, an improved stiffness thereby each said closed cell foamed plastic material sheet element has an enhanced stability as the washing brush is rotatively driven.

4. A washing brush, according to claim 1, characterized in that said belt bristles further comprise felt bristles for drying the washed motor vehicle in cooperation with auxiliary rotary brush assemblies coated by a felt material for absorbing remaining moisture.

* * * * *